July 21, 1964  N. LAING  3,141,454
HEAT STORAGE APPARATUS
Filed Feb. 13, 1961
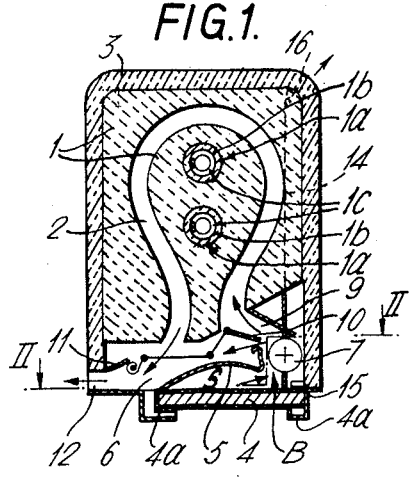
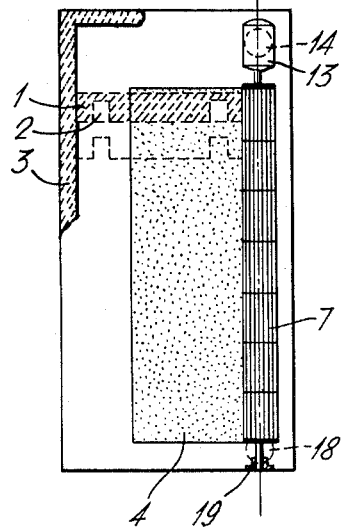
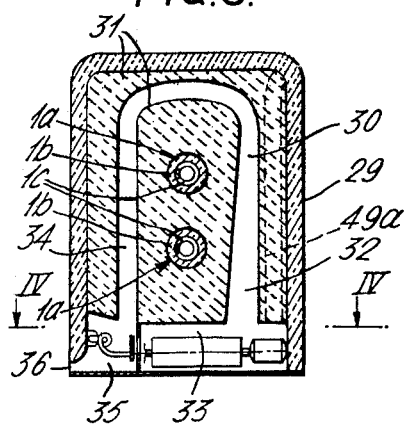
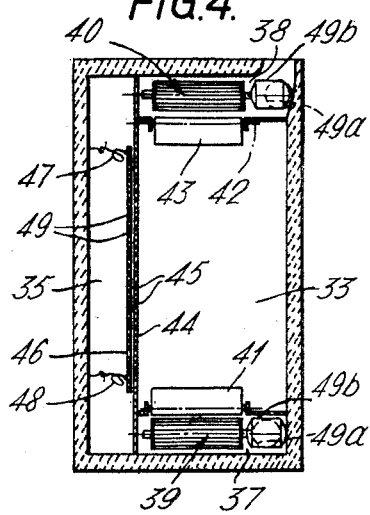
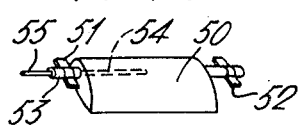
INVENTOR
Nikolaus Laing
By Watson, Cole, Grindle & Watson
ATTORNEYS

United States Patent Office 3,141,454
Patented July 21, 1964

3,141,454
HEAT STORAGE APPARATUS
Nikolaus Laing, Rosenbergstrasse 24a,
Stuttgart, Germany
Filed Feb. 13, 1961, Ser. No. 88,950
Claims priority, application Germany Feb. 11, 1960
3 Claims. (Cl. 126—110)

This invention relates to heat storage apparatus, that is apparatus where heat can be stored and from which stored heat can be extracted by a current of air. Such apparatus can for example include an insulated stack of ceramic elements wherein heat is generated electrically at night or at other times when an off-peak reduced tariff applies, the stored heat being used to warm rooms during the day or at other times when electricity is more costly. The invention concerns more especially forced draught heat storage apparatus.

The invention provides heat storage apparatus comprising heat storage means and at least one duct therethrough such that a current of air through the duct extracts stored heat from the storage means, and a blower to induce a flow of air through the duct, the blower comprising a motor-driven drum-shaped bladed rotor and means to guide the throughput through the blades in a direction transverse to the axis of the drum.

The throughput rate may be easily controlled. Regulable means are provided for recirculating to the suction side of the blower air which leaves the rotor; this air can flow in a closed circuit including the rotor. By these means the blower can be throttled almost to zero throughput.

In apparatus according to the invention the blower rotor is cylindrical; because of this and of the fact that the blower gives exceptionally good pressure and delivery ratios, the blower can be made very compact. Therefore, bearing in mind the ease of control referred to, without appreciable extra cost apparatus according to the invention can be provided with a blower capable of a delivery which greatly exceeds normal requirements. When the apparatus is required to provide an occasional high rate of heat extraction the blower can be regulated to give full delivery, while under normal operation conditions the blower is throttled.

An ultra-rapid discharge is frequently desirable, and it is possible to achieve it with the aid of the present invention at low cost and with the generation of little noise; however it has been found that it involves certain risks. The core of a ceramic heat storage system may be heated to temperatures of 1000° C. If at the beginning of heat discharge a considerable volume of air is blown through the core a long hot jet will emerge which may be at a temperature as high at 700° C. A current of air of this kind is naturally dangerous, because it is capable of setting fire to light clothes in its vicinity.

It is therefore proposed by the present invention at the beginning of the discharge to bypass a portion of the blower throughput directly to an outlet nozzle and to vary the proportion by-passed so that the exit temperature of the air remains substantially constant.

Another disadvantage of a high rate of heat discharge is that dust may be entrained from the suction side, especially if this is located under the apparatus, and this dust may burn in the ducts of the plant. The invention therefore proposes to provide the air entry with a filter.

Conventional axial flow blowers have a centrally located motor which is situated in the stream of cold air; in the apparatus according to the invention the motor is outside the air stream of the blower unless special air ducts are provided. To this end the invention provides air ducts through which a natural-draught air flow is maintained independently of the operational state of the motor. This ensures that the temperature of the motor will not rise to inadmissible levels after it has been switched off. The same arrangement may be provided for bearings. In these natural-draught circulating systems, which draw in air from outside, the invention proposes to provide ambient temperature thermostats. These are also exposed to the air stream, independently of the operation of the motor, at a point where the air is still at room temperature.

Various embodiments of the invention will now be described by way of example with reference to the accompanying diagrammatic drawings in which:

FIGURES 1 and 2 are respectively a vertical section and a horizontal section of one form of heat storage apparatus;

FIGURES 3 and 4 are views similar to FIGURES 1 and 2 of a second form of heat storage apparatus, the FIGURE 4 section being taken upon the line 3—3 in FIGURE 3;

FIGURE 5 is a perspective view of a part of the apparatus of FIGURES 3 and 4.

Referring to FIGURES 1 and 2 of the drawing, the apparatus there shown comprises heat storage means 1 surrounded by an insulating jacket 3. The heat storage means 1 consists of plates in which electric heating elements 1a are embedded. The heating elements 1a consist of ceramic tubes 1b in which are helical resistor wires 1c. The plates are formed with recesses forming channels 2. The air enters through a filter 4 which is located in means 4a from which it is removable from one side like a drawer. A dividing plate 5 separates a suction chamber S from a return chamber 6. A blower designated generally B and comprising a cylindrical bladed rotor 7 is located above the filter 4 to cause air to flow from the suction chamber S through the channels 2 to the return chamber 6. The air leaving the rotor 7 passes through a diffuser 9 before entering the channels 2. One side 10 of the diffuser has a flap which is deflectable by a temperature-controlled regulator 11 incorporating a temperature-sensitive element such as a bimetal strip located in the return chamber 6. The air in the chamber 6 has received heat from the storage means 1 and is ejected into the surroundings through a slit nozzle 12. If the temperature in the chamber 6 is too high, the bimetal strip 11 deflects the flap 10 so that some of the cold air delivered by the blower enters chamber 6 to mix with the air which has been heated in the course of its passage through chanel 2. This arrangement excludes the possibility of the temperature of the air discharged through the nozzle 12 being excessive.

The rotor 7 is driven by a motor 13 which is cooled by a separate airstream which flows through a flue 14 located in the drawing behind the section plane of FIGURE 1 and indicated by dotted lines in both figures. This air enters through an opening at 15 (FIGURE 1) and leaves through an opening at the top at 16. So long as the apparatus is hot, air will flow through this flue, even if the blower B is stopped, the rate of flow in the air depending upon the temperature of the storage means 1, i.e. upon the magnitude of the natural draught.

The flue 14 also contains an ambient air thermostat which, independently of the operation of the blower, senses the ambient temperature. The apparatus is controlled in the simplest possible manner by starting and stopping the blower B, but control may alternatively be effected by throttling means.

The apparatus provides a second cooling flue 18 which in a manner analogous to that of the flue 14 carries a natural-draught air current for cooling the bearing 19 of the blower rotor 7.

The apparatus of FIGURES 3 and 4 resembles that of FIGURES 1 and 2 in comprising an insulating housing 29 containing heat storage means 31 in the form of stacked elements defining channels 30. Electric heating elements 1a consisting of ceramic tubes 1b in which are helical resistor wires 1c are embedded in the stacked elements. The entry side 32 of the channels 30 communicates with a chamber 33 located below the heat storage means 31, while the outlet end 34 of channels 30 leads into an outlet chamber 35 of which one side forms an outlet nozzle 36. The sides of chamber 33 adjoin further chambers 37 and 38. Chamber 37 contains a large blower designated generally 39 for occasional high-speed heat discharge, whereas chamber 38 contains a small blower designated generally 40 for continuous operation. The opening in the wall between chamber 37 and chamber 33 contains a non-return flap 41 which is opened automatically by pressure generated by blower 39 as soon as the latter is switched on; flap 41 closes when blower 39 is switched off and blower 40 is in operation, so as to prevent a back current of air. Chambers 38 and 33 are likewise separated by a flap 43 which is pivotable about an axis 42. However, this flap is not operated by the pressure of blower 40 but is controlled by a bimetal strip (described by reference to FIGURE 5). As soon as blower 40 is started up the temperature of flap 43 will fall and cause the bimetal strip which is heated by the radiated heat from the heat storage means 31 to open the flap.

The outlet chamber 35 is divided from chamber 33 by a partition 44. This partition has slots 45 which are closed by an overlying plate 46 with matching slots when the slots in the two plates are out of register. Plate 46 is supported by bimetal elements 47 and 48 arranged in the manner of a parallelogram linkage so that on change of temperature the plate 46 moves lengthwise in its own plane. These bimetal elements 47, 48 consist either of linear strips or of strips coiled like watch springs. In course of operation of the smaller blower 40, flap 43 soon opens by being cooled, cold air enters the channels 30 at 32 and re-emerges in the outlet chamber 35. If the temperature is excessive the bimetal elements 47 and 48 displace plate 46 and thus permit cold air to enter the outlet chamber 35 through the openings 49 which are formed when the slots in the partition portion 44 and in the plate 46 come into register. The cold air mixes with the hot air in the chamber 35, and the air mixture issuing from the outlet nozzle 36 is thus controlled to the desired temperature level. Flues 49a are formed in the apparatus for the natural-draught cooling of the blower motors 49b, and a thermostat is located adjacent the entry to one of these flues.

FIGURE 5 shows the above-mentioned flap 43 in detail. The flap 43 is a hollow member of streamlined shape pivoted longitudinally at 51 and 52. A bimetal strip 54 secured to the casing at 55 extends through the hollow. The action of the bimetal strip 54 is to deflect the flap 43 into the horizontal when cooled by blower 40. If blower 39 is operated alone the air which reaches flap 43 has already been sufficiently heated on the underside of the heat storage means 31 to cause the flap to re-close.

I claim:
1. Heating apparatus comprising a body having a high heat storage capacity defining a passage through which air can be passed, said passage having an inlet and an outlet, means to heat said body, a blower having an inlet side and an outlet side, said outlet side being disposed adjacent the inlet of said passage whereby operation of said blower causes air flow through the passage, said blower including an impeller and a motor to drive said impeller which motor is located adjacent the body to be heated thereby, and a flue formed in said body, said flue having an inlet means in substantially vertical alignment with said motor and an outlet located above the inlet means whereby upon heating said body a flow of air is established in said flue drawing cooling air over the motor.

2. Heat storage apparatus comprising a high temperature storage block defining a passage having an inlet and an outlet through which passage air can be passed from the inlet to the outlet to extract heat from the block, means to heat the block to a high temperature, a blower having an inlet side and an outlet side, said outlet side being disposed adjacent the inlet of said passage whereby operation of the blower causes air flow through the passage, said blower including an impeller and a motor driving the impeller which motor is located underneath the block to be heated thereby, and a flue formed in the block, said flue having an inlet in substantially vertical alignment with the motor and an outlet above the inlet, whereby in operation the flue draws cooling air over the motor by natural convection.

3. Apparatus as claimed in claim 2 wherein the impeller is supported in a bearing at an end opposite the motor and a second flue formed in said block, said flue having an inlet in substantially vertical alignment with said bearing and an outlet above the inlet whereby in operation said second flue draws cooling air over the bearing by natural convection.

References Cited in the file of this patent
UNITED STATES PATENTS

| | | |
|---|---|---|
| 849,061 | Garner | Apr. 2, 1907 |
| 1,886,513 | Anderson | Nov. 8, 1932 |
| 2,458,835 | Cornelius | Jan 11, 1949 |
| 2,479,571 | Hewitt | Aug. 23, 1949 |
| 2,894,728 | Davis | July 14, 1959 |

FOREIGN PATENTS

| | | |
|---|---|---|
| 759,049 | Great Britain | Jan. 3, 1955 |

OTHER REFERENCES

Monthly Bulletin of State College of Washington, July 1935, volume XVIII, Number 2, published by State College of Washington, Pullman, Washington, page 7.